United States Patent

[11] 3,565,278

| [72] | Inventor | Houston Rehrig<br>Pasadena, Calif. (4291 Bandini Blvd., Los Angeles, Calif. 90023) |
|---|---|---|
| [21] | Appl. No. | 793,721 |
| [22] | Filed | Jan. 24, 1969 |
| [45] | Patented | Feb. 23, 1971 |

[54] PARTITION PANEL STRUCTURE FOR MOLDED PLASTIC CRATE
12 Claims, 3 Drawing Figs.

[52] U.S. Cl. .................................................. 220/21
[51] Int. Cl. .................................................. B65d 1/24, B65d 25/14
[50] Field of Search ...................................... 220/21, 22, 66, (PBC) (Plastic)

[56] References Cited
UNITED STATES PATENTS

| 2,928,530 | 3/1950 | Sauey | 220/21X |
| 3,155,268 | 11/1964 | Fogerty | 220/21 |
| 3,351,228 | 11/1967 | Huisman | 220/66 |

*Primary Examiner*—George E. Lowrance
*Attorney*—Beveridge & DeGrandi

ABSTRACT: A molded plastic material-handling crate partitioned by intersecting integrally molded panels within the crate which are corrugated along the panel intersections to accommodate flection and expansion of the crate during use, and differential shrinkage of the crate and panels following removal from the forming mold.

PATENTED FEB 23 1971 3,565,278

INVENTOR
HOUSTON REHRIG

BY Browne, Schuyler & Beveridge
ATTORNEYS

PARTITION PANEL STRUCTURE FOR MOLDED PLASTIC CRATE

BACKGROUND OF THE INVENTION

This invention relates to an improvement in partitioned crates for material handling, and more particularly to an improved crate for handling a plurality of containers such as bottles for milk or other beverages.

It is known to manufacture partitioned crates by injection molding the crate from a thermoplastic synthetic resin or similar material, referred to herein broadly as plastics. In production, such crates are normally removed from the molds while the plastic material is still hot enough to be relatively soft and flexible, with the final cooling taking place outside the mold. As a result of the different thicknesses and geometric configuration among the various structural members in each crate, various cooling rates occur throughout each crate on its removal from the mold. Differential shrinkage among the various structural members may result from this differential cooling, thereby producing stresses within the crate sufficient to warp or deform segments of the crate and cause or expedite its structural failure in use.

Known crates of this kind also have the disadvantage of intersectional rigidity between adjacent panels used to partition the crate into individual bottle compartments. As a result, deflection of a single panel or panel portion resulting from rough handling of the crate, or from other causes, can rupture the partitions and/or disrupt or damage the bottles carried in adjacent compartments. Also, in known crates of this kind, deflection, expansion or shrinkage of an individual partition panel may stress or strain adjacent partition panels and may thus adversely affect adjacent compartments in the crate, such as, for example, by interfering with the insertion and removal of bottles by automatic filling machines.

An object of the present invention is to provide an improved molded plastic material handling crate having partition panels integrally molded with the sidewalls of the crate.

Another object of the present invention is to provide such a crate having means to relieve internal stresses in the structural members of the crate.

Another object of the present invention is to accommodate differential shrinkage among the various structural members in a molded partitioned crate.

Another object of the present invention is to provide an improved molded plastic crate having means to accommodate differential cooling rates among the various structural members molded in the manufacture of the crate.

Another object of the present invention is to accommodate differential deflection or expansion among the various structural members in a molded partitioned crate.

Another object of the present invention is to facilitate insertion and removal of bottles and other articles carried in the various compartments of molded partitioned crates.

SUMMARY OF THE INVENTION

In the attainment of the foregoing and other objects, one feature of the invention resides in the use of flexible, resilient molded plastic partition panels perpendicularly intersection within and dividing a conventional rectangular material-handling crate, and particularly an integrally molded plastic crate, into individual compartments. A number of the partition panels are longitudinally of and perpendicular to the bottom of the crate, and other partition panels are disposed transversely of and perpendicular to the bottom of the crate. Each partition panel is corrugated adjacent to and on each side of its intersection with the other partition panels which intersect it within the crate. The corrugations adjacent each such intersection radiate arcuately outwardly in a common rotary direction from the intersection. The plane of the surface of each corrugation at the intersection is at an angle from the plane of the panel of which each corrugation is a part, curving back into the panel plane outwardly of the intersection. Thus, in vertical cross section as viewed from a point on an extension of the line of intersection, the corrugations at each intersection may form in combination a curvilinearly-spoked swastikalike pattern, with the two corrugations in each panel cooperating to form a reverse, or S-shaped curve at the intersection.

The corrugations in each panel thus provide a flexible, slightly resilient, springlike section in each partition panel and adjacent each panel-to-panel intersection to accommodate longitudinal expansion and shrinkage in the panel, as well as limited lateral deflection of the panel, without materially stressing or deflecting the sidewalls of the crate. The corrugated or arcuate portions of each partition panel in the molded plastic crate embody such a compressible and distendable curvature as to accommodate differential shrinkage, deflection or expansion among the various structural members of the crate in which they reside, and thereby materially increase the life of the crate.

DESCRIPTION OF THE DRAWINGS

Other objects and features of the invention will become apparent from the following more detailed description wherein reference is made to the accompanying drawings in which.

DESCRIPTION OF A PREFERRED EMBODIMENT

Figure 1:
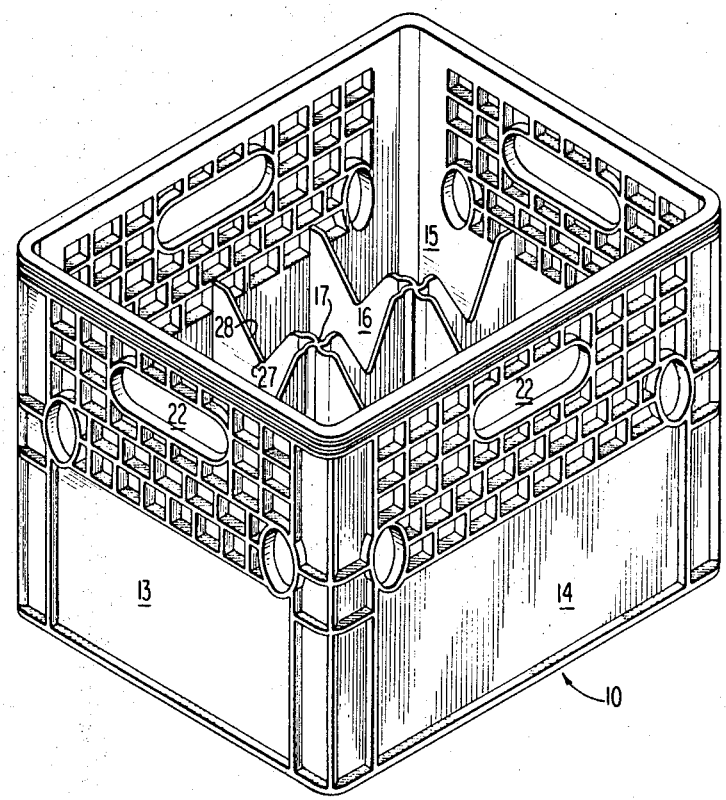
FIG. 1 is a perspective view of a partitioned material-handling crate embodying the invention.

Referring now to the drawings in detail, a molded plastic material-handling crate according to the present invention is indicated generally by the reference numeral 10 and includes a rectangular bottom member 12 and integrally molded vertically extending end walls 13 and sidewalls 14. The interior of the crate 10 is divided into a plurality of individual compartments 15 by a plurality of vertically extending partition panels 16 integrally molded with end walls 13 and sidewalls 14 and intersecting as at 17. Individual panels 16 are each disposed in planes substantially parallel to one of the end walls 13 or one of the sidewalls 14 so that the compartments are generally rectangular in vertical cross section. The bottom member 12 may have a stacking ring 18 integrally molded around its outer periphery, and the end walls 13 and sidewalls 14 may be reinforced by a suitable reinforcing or stiffening ring 20 extending around the top of the crate. Also, suitable handhold openings 22 may be formed in walls 13, 14 in the conventional manner.

Figure 3:
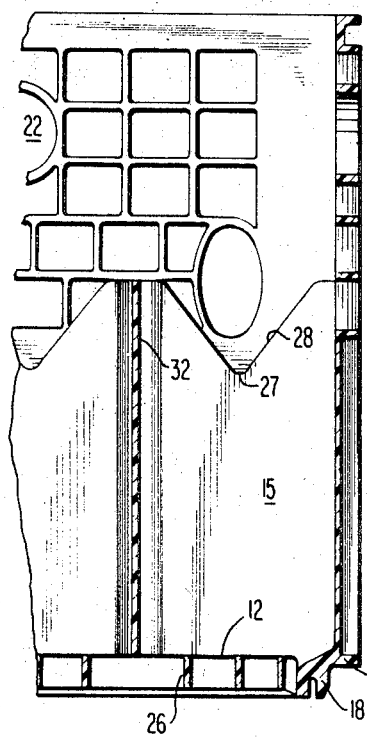
FIG. 3 is a sectional view taken on line 3-3 of FIG. 2.
Figure 2:
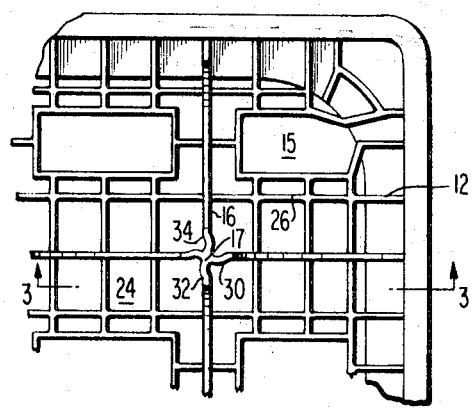
FIG. 2 is an enlarged, fragmentary top plan view of a portion of the crate shown in FIG. 1, and illustrating an intersection of the partition panels of the crate.

Referring to FIG. 2, it is seen that the bottom member 12 is molded in the form of an open gridlike structure including a plurality of interstitial spaces 24 defined by elongated weblike beams 26 integrally joined at their respective ends. Bottom member 12 is integrally molded with end walls 13 and sidewalls 14, the partition panels 16 are integrally molded with bottom member 12, with the points of intersection 17 of partition panels 16 with each other being disposed above one of the open spaces 24 of the grid. As can be seen in FIGS. 1 and 3, a V-shaped notch 27 is formed in the panels 16 between each of the intersections 17 to provide guiding edges 28 on the upper side of the framework, which guiding edges 28 are inclined toward bottom member 12 to act as a cam, or guide to facilitate placement of articles such as bottles into the individual bottle compartments 15.

Adjacent each side of the intersections 17, and disposed above the associated open space 24, is a corrugated section 30 formed in each panel 16. Corrugated sections 30 radiate arcuately outwardly in a common rotary direction from the partition panel intersection 17. The plane 32 tangent to the surface of each corrugated section 30 at each partition panel intersection 17 is disposed at an angle from the plane of partition panel 16 of which the corrugated section 30 is a part. Outward from each intersection 17, the respective corrugated sections 30 curve back to connect with the plane of the associated partition panel 16 at point 34. Thus, in plan view as seen in FIG. 2, the four corrugated sections 30 at each intersection 17 appear as curved spokes in a swastikalike pattern. The radius of curvature of the respective corrugated sections 30 is relatively short to provide the desired degree of flexibility for the panels 16. However, by maintaining the corrugations closely adjacent the intersection 17, they do not impair the use of the individual compartments 15 for carrying conventional glass containers of the type employed, for example, in the diary, soft drink, or beer industries. Such containers conventionally are either of circular or elliptical cross section, or are generally rectangular with rounded corners and edges so that the corrugations do not interfere with the containers. Guiding edges 28 are particularly effective in filling the crate with such conventional glass containers.

Corrugated sections 30 in each partition panel 16 thus provide an expansion joint at each partition panel sufficient to withstand considerable increased or decreased overall panel length or deflection, such as might occur in crate handling or as a result of inner stresses in crate 10 wrought in the hot molding and variable cooling operations encountered in the crate manufacturing process. The arrangement of the corrugations above an opening 24 in the bottom member 12 is desired to eliminate any restraining force being applied by the bottom member 12 to the expansion joint, or corrugation 30, at each intersection 17.

While the partition panels 16 are illustrated as being integrally molded with the bottom member 12, this construction is not essential to the invention, and it is contemplated that the bottom member may be formed as a separate wire frame grid and subsequently attached to the sidewalls as illustrated in my copending Pat. application Ser. No. 733,740. Accordingly, while I have disclosed and described a preferred embodiment of my invention, I wish it understood that I do not intend to be restricted solely thereto, but that I do wish to include all embodiments thereof which would be apparent to one skilled in the art and which come within the spirit and scope of my invention.

I claim:

1. A material-handling crate comprising a rectangular bottom member, integrally molded sidewalls and end walls mounted on and extending upwardly from the sides of said bottom member, a plurality of partition panels within said crate including at least one longitudinal partition panel integrally molded with an extending substantially perpendicular to said end walls and disposed substantially perpendicular to said bottom member and at least one transverse partition panel integrally molded with and extending substantially perpendicular to said sidewalls and disposed substantially perpendicular to said bottom member, said transversely disposed partition panels and said longitudinally disposed partition panels perpendicularly intersecting along a straight line of intersection, and vertically extending corrugation means formed in each of said partition panels, said corrugation means extending throughout the full height of said partition panels permitting limited independent longitudinal expansion and contraction of said partition panel within said crate.

2. A crate as defined in claim 1, wherein said bottom member is integrally molded with said sidewalls and said end walls.

3. A crate as defined in claim 2, wherein said bottom member comprises a grid of integrally molded beams intersecting each other with interstitial spaces among said beams.

4. A crate as defined in claim 3, wherein said bottom member is integrally molded with said partition panels.

5. A crate as defined in claim 4, wherein said corrugation means in each of said panels is disposed above one of said spaces whereby said corrugation means is not restrained by said integrally molded bottom member.

6. A crate as defined in claim 1, wherein said corrugation means in each of said panels comprises at least two corrugations in each of said partition panels disposed one on each side of and adjacent each said line of intersection, each of said corrugations dimensioned to radiate arcuately outwardly from said line of intersection.

7. A crate as defined in claim 5, wherein the plane tangent to the surface of each of said corrugations at said line of intersection is disposed at an angle from the plane of the panel of which each of said corrugations is a part, said corrugations arcuately returning to integrally connect with said panel plane outwardly of said line of intersection.

8. A crate as defined in claim 7, wherein each of said corrugation surfaces is perpendicular to the next adjacent corrugation surface at said line of intersection.

9. A crate as defined in claim 5, wherein said corrugations are of common cross-sectional configuration at any point along said line of intersection.

10. In a material-handling crate having a generally rectangular bottom member, a pair of generally vertical and substantially parallel opposed sidewalls, a pair of generally vertical and substantially parallel opposed end walls, said side and said end walls being integrally molded and joined to said bottom member adjacent the side edges thereof, and a partition panel structure separating the interior of said crate into a plurality of compartments for segregating and protecting individual articles packaged therein, the improvement wherein said partition panel structure comprises, at least one vertically disposed longitudinal partition panel disposed between and substantially parallel to said end walls and integrally molded with said sidewalls, at least one vertically disposed transverse partition panel disposed between and substantially parallel to said sidewalls and integrally molded with said end walls, said longitudinal and said transverse panels intersecting and being integrally joined to one another throughout their full height along a vertical line within said crate, and expansion means integrally molded in said longitudinal and said transverse partition panels adjacent said vertical line and extending the full height of said panels to thereby permit independent longitudinal expansion and contraction of said longitudinal and transverse panels, said sidewalls, said end walls, said transverse partition panel and said longitudinal partition panel being integrally molded from a single homogenous mass of plastic material.

11. In a material handling crate as defined in claim 10, the further improvement wherein said expansion means comprises a reverse curve portion in each said partition panel, said reverse curve portions extending on each side of said vertical line.

12. In a material-handling crate as defined in claim 11, the further improvement wherein a downwardly extending V-shaped notch is formed in the top edge each of said partition panels between each of said intersections.